United States Patent [19]

Cooley

[11] Patent Number: 4,583,900
[45] Date of Patent: Apr. 22, 1986

[54] ROUND HAY BALE HANDLING APPARATUS HAVING AT LEAST ONE SCREW SPEAR

[76] Inventor: Nickolas A. Cooley, Coal Run Village P.O. Box 2286, Pikeville, Ky. 41501

[21] Appl. No.: 697,798

[22] Filed: Feb. 4, 1985

[51] Int. Cl.[4] .......................................... A01D 87/12
[52] U.S. Cl. .................................... 414/24.5; 294/61; 294/121; 414/721
[58] Field of Search ................... 414/24.5, 24.6, 721; 294/61, 121, 81.6

[56] References Cited

U.S. PATENT DOCUMENTS

| 2,205,550 | 6/1940 | Wehr | 294/121 X |
| 4,120,405 | 10/1978 | Jones et al. | 414/24.5 |
| 4,306,825 | 12/1981 | Yilit | 414/24.5 |

FOREIGN PATENT DOCUMENTS

| 1481870 | 6/1969 | Fed. Rep. of Germany | 294/121 |
| 40473 | 2/1915 | Sweden | 294/121 |
| 120976 | 2/1948 | Sweden | 294/121 |
| 511275 | 6/1976 | U.S.S.R. | 294/121 |
| 678026 | 8/1979 | U.S.S.R. | 294/121 |

Primary Examiner—Leslie J. Paperner
Attorney, Agent, or Firm—Frank C. Leach, Jr.

[57] ABSTRACT

A hay bale handling apparatus has a screw spear, which is rotatably supported by a frame, advanced into a round hay bale by a hydraulic motor, which is mounted on the frame, rotating the spear as a vehicle, which may be a tractor, for example, having a front loader, a backhoe, or a farm loader attached thereto, for example, supporting the frame is advanced. The frame has a bearing rack supported thereon with spaced picks of relatively short length engaging portions of the bale to provide stability to the bale when the screw spear has been advanced into the center of the bale. Three screw spears of the same length may be employed instead of the single screw spear with the spears being rotated in the same direction through a sprocket and chain arrangement with one of the sprockets attached to an output shaft of the hydraulic motor. This arrangement also may use the bearing rack. The three screw spears are of smaller diameter and lesser length than the single screw spear, which penetrates slightly less than the entire length of the hay bale.

16 Claims, 9 Drawing Figures

ROUND HAY BALE HANDLING APPARATUS HAVING AT LEAST ONE SCREW SPEAR

This invention relates to a hay bale handling apparatus and, more particularly, to a hay bale handling apparatus having at least one screw spear for advancement into a round bale of hay.

Hay is presently baled with a round shape. This is an efficient way of producing a hay bale because more material is baled in the same period of time than with the prior rectangular shaped bales, but it also produces a rather heavy and relatively large hay bale. For example, a round bale of hay may have a diameter of five feet with lengths of four feet, five feet, and seven and one-half feet, respectively, and maximum weights of about 1,400, 1,850, and 2,600 pounds, respectively. Of course, the type of hay such as clover or fescue, for example, and the amount of moisture has an effect on the weight of the bale.

Because of its size and weight, the round bale cannot be handled manually. Therefore, many farmers have allowed the hay to remain lying in the field where it has been baled until it is time to feed the animals. However, these bales are exposed to the rain, snow, and sun so that they tend to rot and deteriorate before they can be completely fed to the animals. This produces an average loss of about twenty per cent of the product.

Various types of apparatuses have previously been suggested to handle these large round hay bales so that they may be stored in a protected area to which they may be transported. Examples of such apparatuses are shown and described in U.S. Pat. No. 4,120,405 to Jones et al, U.S. Pat. No. 4,256,426 to Buss, U.S. Pat. No. 4,288,191 to Lynch, and U.S. Pat. No. 4,329,103 to Miller.

In the apparatus of the aforesaid Jones et al patent, for example, the round hay bale is penetrated by one long spear and two short spears. While the aforesaid Jones et al patent shows the long spear completely penetrating a round hay bale at its center and extending beyond the hay bale, the operation of the apparatus of the aforesaid Jones et al patent does not result in penetration of the hay bale to this extent. Instead, the long spear penetrates into the hay bale for approximately half of the length of the hay bale. Actually, it is not desired for any spear to penetrate beyond a hay bale because the spear would injure anyone contacting its protruding point.

To obtain penetration of the long spear of the apparatus of the aforesaid Jones et al patent, it is necessary for the transport means, which supports the apparatus, to have a running start towards the hay bale because of the force necessary to cause the long spear to penetrate the hay bale. Because this force increases as the diameter of the spear increases, the single long spear cannot have a sufficient diameter to provide a relatively large bearing surface for the hay bale and still obtain sufficient penetration of the hay bale to support it.

Additionally, the two short spears of the apparatus of the aforesaid Jones et al patent will penetrate the hay bale for only a short distance because the long spear only penetrates the hay bale for approximately half of its length. Therefore, most of the weight of the hay bale is supported by the single long spear of the apparatus of the aforesaid Jones et al patent.

With the single long spea supporting most of the weight of the bale, there is a substantial droop of the bale on the single long spear due to the weight of the bale and insufficient bearing surface. Any motion of the apparatus resulting in the long spear being less than horizontal has the tendency of causing the bale to be lost from the long spear. This can occur, for example, during various motions of the bale when attempting to support the bale in a certain area. The loss of the bale from the spear can cause serious injury.

Because of the necessity of the transport means obtaining a running start to provide sufficient force to cause the long spear of the apparatus of the aforesaid Jones et al patent to penetrate the bale sufficiently to support the bale, the use of the apparatus of the aforesaid Jones et al patent is limited in that bales cannot be stacked and then removed from the stack. That is, even if the bale on the long spear could be elevated for stacking on top of other bales without losing the hay bale from the long spear because of the substantial droop of the bale on the long spear and the long spear being less than horizontal, there is no way that any bale above the ground could be penetrated by the long spear of the apparatus of the aforesaid Jones et al patent by a running start when it is desired to remove the bale from an upper level of the stack. This is because the force of penetration of the long spear would push the bale off the stack.

Therefore, the apparatus of the aforesaid Jones et al patent is not capable of enabling round hay bales to be stacked in a barn, for example, which has a limited ground area. Instead, the apparatus of the aforesaid Jones et al patent has only been capable of placing the bales on the ground within the barn. Because of the limited ground area in the barn and the size of the round hay bale, it is not economical or practical to store round hay bales in a barn without stacking them. The apparatus of the aforesaid Jones et al and the apparatus of each of the aforesaid Buss, Lynch, and Miller patents are not capable of stacking bales. Therefore, as previously discussed, farmers have allowed the round hay bales to remain lying in the field where they deteriorate since there is no way of stacking the bales so that they occupy a reasonable ground area in the limited space in the barn where they can be protected.

The hay bale handling apparatus of the present invention satisfactorily solves the foregoing problems through providing at least one screw spear which is advanced into the bale by rotation of the screw spear at the same time that the transport means, which supports the spear, is advanced towards the bale. Thus, the screw spear obtains a grip on the bale while also being easily advanced thereinto through having separate power rotating means. Accordingly, there is no dependency of the spear penetrating the bale solely because of the advancement of the transport means. Instead, there also is the rotation of the spear into the bale.

By using the screw spear of the apparatus of the present invention, the movement of the spear to a position less than horizontal does not result in the bale ceasing to be retained by the screw spear of the apparatus of the present invention. This is because the screw spear has been positively advanced into the bale and has engagement therewith.

Because the screw spear of the apparatus of the present invention is advanced by rotation into the bale rather than being forced into the bale as in the aforesaid Jones et al patent, the spear of the apparatus of the present invention may be much larger in diameter than the long spear of the aforesaid Jones et al patent. This results in a much larger bearing surface being supplied by the screw spear of the apparatus of the present invention to lift the weight of the bale.

Therefore, with the much larger bearing surface of the screw spear of the apparatus of the present invention, the weight of the bale will not cause a substantial droop of the bale relative to the screw spear. Accordingly, lifting of the bale onto a second or higher row of a stack may be readily accomplished without any droop of the bale so that the bale cannot be lost from the screw spear.

Because of the absence of any requirement for a running start by the transport means since the screw spear is advanced into the hay bale by rotation of the screw spear, the round hay bales can be easily stacked on top of each other and then removed therefrom. That is, the screw spear may be raised to a second or third row, for example, of a stacked arrangement of round hay bales and then advanced into the round hay bale at the top of the stack. The round hay bale will not move away from the screw spear since it is being advanced by rotation of the screw spear rather than by longitudinal force exerted on the screw spear by advancement of the transport means on which it is carried. Accordingly, economical and practical utilization of the limited ground area within a barn is obtainable with the hay bale handling apparatus of the present invention since the round hay bales may be safely and satisfactorily stacked and unstacked.

Furthermore, if desired, the round hay bales could be stacked in the field and then covered with a tarpaulin, for example. Thus, it would not even be necessary to transport the hay bales to a barn, and they could still be protected from the elements, which cause deterioration, by the tarpaulin.

Additionally, if desired, the hay bale handling apparatus of the present invention may be used to stack the round hay bales on a truck for transportation to a distant location or on a wagon or truck for transportation from a field to a barn. Of course, this would require the hay bale handling apparatus of the present invention to be used to remove the stacked round hay bales at the distant location or in the barn.

If desired, the hay bale handling apparatus of the present invention also may have a bearing rack. This would provide additional stability to the bale adjacent the frame and penetrate only a very slight distance such as four inches, for example, into the bale at various spaced distances around the bale. The bearing rack would prevent any spinning of the bale on the screw spear.

If desired, the hay bale handling apparatus of the present invention may utilize more than one of the screw spears. When this occurs, they are all driven from a common power source in the same direction.

When three of the screw spears are employed in the apparatus of the present invention, they may be substantially smaller in diameter and length than when only the single screw spear is employed. This is because the weight of the bale is now distributed over a plurality of the screw spears. The use of the three screw spears of the same length eliminates any problem of instability of the round hay bale although the bearing rack may still be employed when three of the screw spears are utilized.

Furthermore, when using three of the screw spears, they are advanced into the more densely packed parts of the bale than the single screw spear to increase their holding power. That is, the center of a round bale is where rolling starts so that it is the most loosely packed portion. The round bale is most densely packed at its circumference. Thus, with the three screw spears being disposed equal distances from each other so as to form the corners of an equilateral triangle, the three screw spears would penetrate into more densely packed portions of the bale than when the single screw spear advanced into the center of the bale.

An object of this invention is to provide a unique hay bale handling apparatus for handling bales of relatively large size.

Another object of this invention is to provide a hay bale handling apparatus using at least one screw spear advanced into the bale to be handled by the apparatus through rotation of the spear.

Other objects of this invention will be readily perceived from the following description, claims, and drawings.

This invention relates to a round hay bale handling apparatus including a frame for attachment to transport means or the like movable along the ground in a substantially horizontal direction with the frame having means to rotatably support at least one screw spear so that the screw spear extends substantially perpendicular to the frame. The screw spear rotatably support means is fixed to the frame and extends beyond the frame on the opposite side from that to which the screw spear extends from the frame. Rotating means, supported solely by the rotatably support means, selectively rotates the screw spear in each direction to advance the screw spear with the screw spear substantially horizontal into a round hay bale until the frame engages the round hay bale as the frame is advanced in a substantially horizontal direction towards the round hay bale and to withdraw the screw spear from a round hay bale into which the screw spear has been advanced as the frame is moved away from the round hay bale in a substantially horizontal direction.

The attached drawings illustrate preferred embodiments of the invention, in which.

Figure 1:
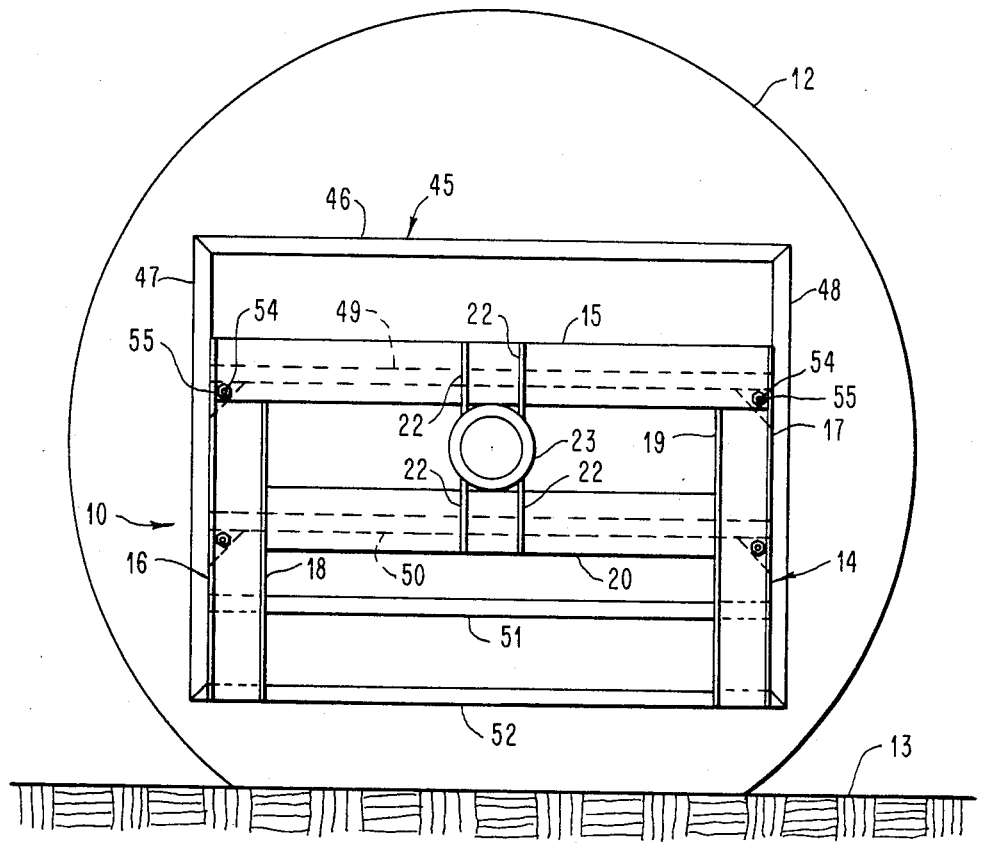
FIG. 1 is a rear elevational view of a hay bale handling apparatus of the present invention having a single screw spear.

Referring to the drawings and particularly FIG. 1, there is shown a hay bale handling apparatus 10 having a single screw spear 11 (see FIGS. 2 and 3) for insertion into a round hay bale 12 (see FIG. 1). When supported on ground 13, the round hay bale 12 sags so as to be flat along its bottom.

The screw spear 11 (see FIGS. 2 and 3) is rotatably supported by a frame 14. The frame 14 includes a horizontal hollow square shaped tube 15 (see FIG. 1) with flat bars 16 and 17 extending vertically downwardly from each end of the tube 15.

Figure 5:
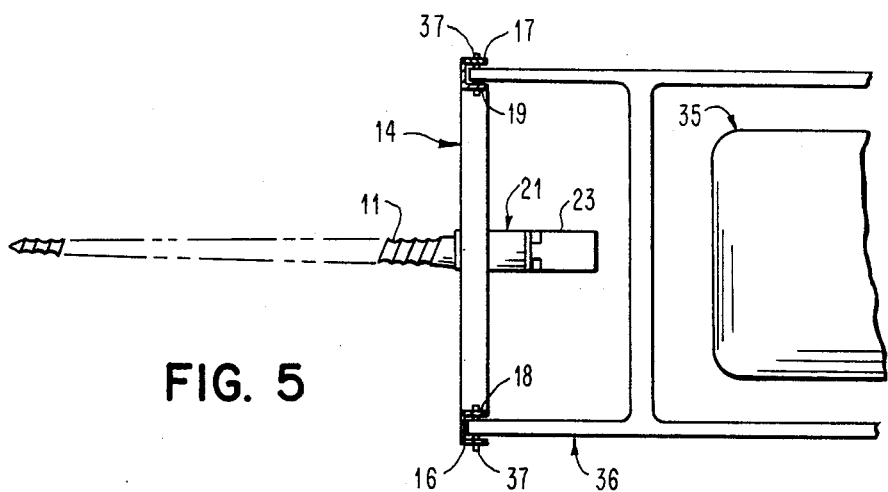
FIG. 5 is a top plan view, partly schematic, of a portion of the apparatus of FIG. 1 and showing the apparatus mounted in a front end loader of a tractor.

The flat bar 16 has an angle 18 welded thereto, and the flat bar 17 has an angle 19 welded thereto. Thus, the flat bar 16 and the angle 18 form a U-shaped recess as do the flat bar 17 and the angle 19 as shown in FIG. 5.

A square shaped tube 20 (see FIG. 1), which is substantially parallel to the tube 15, extends between the angles 18 and 19 and is welded to each. A housing 21 (see FIGS. 2 and 3) is supported on the frame 14 through having four gussets 22 extending between the housing 21 and the hollow square shaped tubes 15 (see FIG. 1) and 20.

Figure 4:
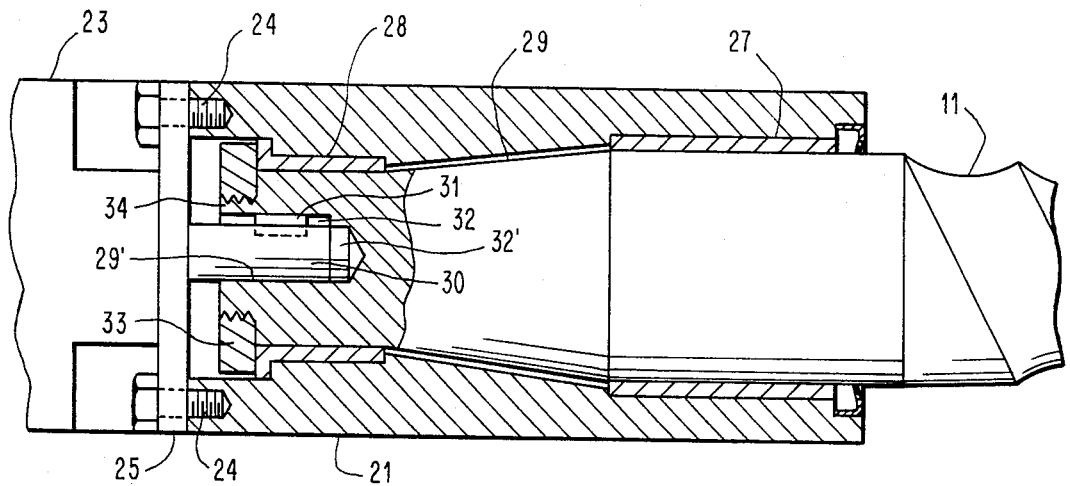
FIG. 4 is a fragmentary sectional view, partly in top plan, of the connection between a hydraulic motor and the screw spear of the apparatus of FIGS. 1-3 including the housing supporting the motor.

A hydraulic motor 23 (see FIG. 4) is mounted on the end of the housing 21 by four bolts 24. The bolts 24 extend through a flange 25 of the hydraulic motor 23. One suitable example of the hydraulic motor 23 is sold by the Hydraulics Division of Eaton Corporation, Eden Prairie, Minn., as its 4000 series having a displacement of 12.5 cubic inches per revolution.

The screw spear 11 is rotatably mounted in the housing 21 by a bearing 27 and an L-shaped bearing 28. The screw spear 11 has a tapered portion 29 between its two circular portions riding on the bearings 27 and 28, which are preferably formed of brass. The tapered portion 29 of the screw spear 11 has a clearance from the housing 21.

The end of the screw spear 11 has a recess 29' to receive an output shaft 30 of the hydraulic motor 23. The output shaft 30 is attached to the screw spear 11 through a key 31 on the output shaft 30 cooperating with a keyway 32 in the screw spear 11. A plug 32' in the recess 29' in the screw spear 11 engages one end of the output shaft 30.

A retaining nut 33 is threaded on a threaded reduced portion 34 of the screw spear 11 to abut the L-shaped bearing 28. This retains the screw spear 11 within the housing 21.

Figure 3:
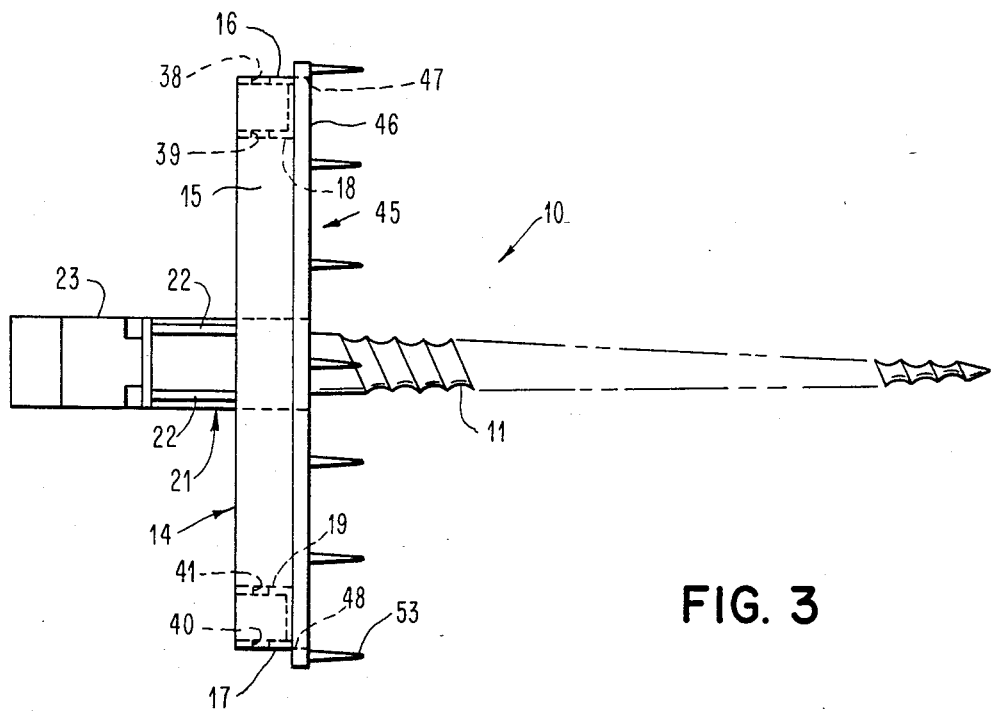
FIG. 3 is a top plan view of the apparatus of FIG. 1.
Figure 2:
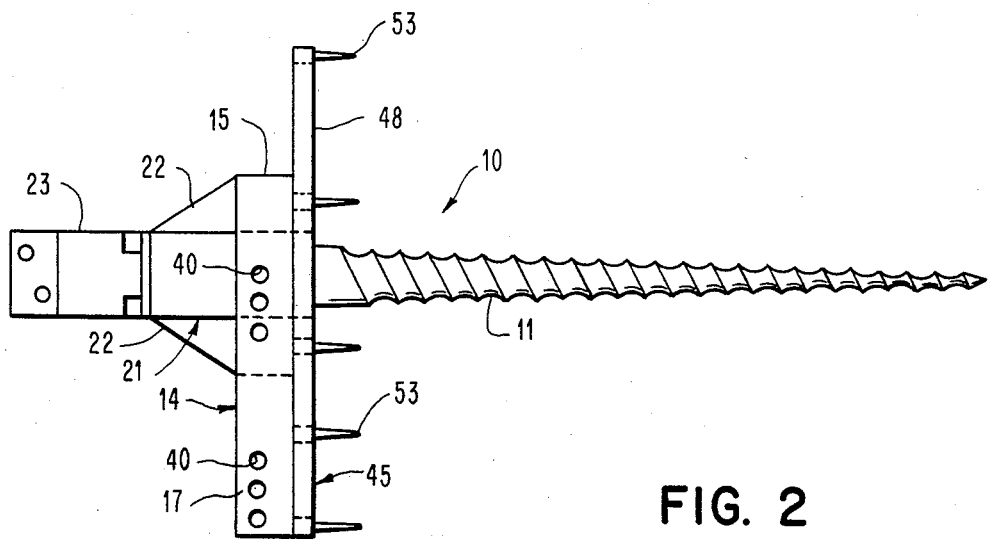
FIG. 2 is a side elevational view of the apparatus of FIG. 1.

As shown in FIGS. 2 and 3, the screw spear 11 tapers from its end adjacent the housing 21 to its free end. For example, the screw spear 11 with a length of four feet six inches so as to not penetrate completely through the bale 12 (see FIG. 1) may have a diameter of four inches at its entrance to the housing 21 (see FIGS. 2 and 3) and a diameter of two inches at its free end. The screw spear 11 may have threads with a two inch pitch, for example.

The frame 14 is attached to transport means 35 (see FIG. 5) such as a tractor, for example, having a front end loader 36 mounted thereon in the well-known manner. The transport means 35 has a source of hydraulic pressure for the hydraulic motor 23 (see FIGS. 2 and 3).

The frame 14 is attached to the front end loader 36 by attaching pins 37 extending through holes 38 (see FIG. 3) in the flat bar 16 and holes 39 in the angle 18 with a portion of the front end of the loader 36 (see FIG. 5) disposed in the U-shaped recess formed by the flat bar 16 and the angle 18. The flat bar 17 (see FIG. 3) has holes 40 and the angle 19 has holes 41 to receive the attaching pins 37 (see FIG. 5) for connection to the portion of the front end loader 36 disposed in the U-shaped recess formed between the flat bar 17 and the angle 19.

As shown in FIG. 2, the flat bar 17 has three of the holes 40 adjacent its bottom and three of the holes 40 near its upper end. The flat bar 16 (see FIG. 1) and the angles 18 and 19 have the same arrangement for the holes 38 (see FIG. 3), 39, and 41, respectively. This enables proper alignment with holes in the front end loader 36 (see FIG. 5). That is, there are only four of the attaching pins 37 with two of the attaching pins 37 being employed with the flat bar 16 and the angle 18 and two holes in the front end loader 36 and the other two of the attaching pins 37 being used with the flat bar 17 and the angle 19 and two holes in the front end loader 36. Additionally, only one of the set of three holes 38 (see FIG. 3), 39, 40, and 41 adjacent to each other receives one of the attaching pins 37 (see FIG. 5) at any time.

The frame 14 (see FIG. 1) has a bearing rack 45 against which the bale 12 engages as the screw spear 11 (see FIG. 2) is advanced into the bale 12 (see FIG. 1). The bearing rack 45 includes an upper horizontal square shaped tube 46, a pair of legs 47 and 48, which are tubes, extending downwardly from the tube 46, and four horizontal square shaped tubes 49, 50, 51, and 52 extending between the legs 47 and 48. The bearing rack 45 is secured to the frame 14 by bolts 54 and nuts 55.

The bearing rack 45 has a plurality of picks 53 (see FIG. 2) extending therefrom for slight penetration into the bale 12 (see FIG. 1) when the screw spear 11 (see FIG. 2) is advanced into the bale 12 (see FIG. 1). The picks 53 (see FIG. 2) may have a length of four inches and a maximum diameter of one-half inch. The picks 53, which are tapered, may have their centers spaced six inches from each other on each of the horizontal tubes 46 (see FIG. 1), 49, 50, 51, and 52 and the legs 47 and 48.

When it is desired to have the screw spear 11 (see FIG. 2) penetrate into the bale 12 (see FIG. 1), the transport means 35 (see FIG. 5) positions the screw spear 11 (see FIG. 2) so that it is disposed at substantially the center of the hay bale 12 (see FIG. 1). Then, as the transport means 35 (see FIG. 5) is advanced towards the hay bale 12 (see FIG. 1), the screw spear 11 (see FIG. 2) is rotated by the hydraulic motor 23 to advance the screw spear 11 into the bale 12 (see FIG. 1). The taper of the screw spear 11 (see FIG. 2) enables easier advancement of the screw spear 11 into the hay bale 12 (see FIG. 1).

When the screw spear 11 (see FIG. 2) is fully advanced into the hay bale 12 (see FIG. 1), the picks 53 (see FIG. 2) also are inserted slightly into the hay bale 12 (see FIG. 1) to provide stability for supporting the hay bale 12. Thus, while the screw spear 11 (see FIG. 2) is supporting the hay bale 12 (see FIG. 1), the picks 53 (see FIG. 2) are aiding in insuring that the hay bale 12 (see FIG. 1) is stabilized. Then, the transport means 35 (see FIG. 5) may cause the front end loader 36 to be lifted in the well-known manner to enable transport of the hay bale 12 (see FIG. 1) to its desired location.

Referring to FIGS. 6-9, there is shown a hay bale handling apparatus 60. The hay bale handling apparatus 60 has three screw spears 61, 62, and 63 rotatably supported by a frame 64. The screw spears 61-63 are spaced equal distances from each other and are disposed so as to be at the corners of an equilateral triangle.

The frame 64 includes a rectangular shaped upper horizontal tube 65 having flat bars 66 and 67 extending downwardly therefrom. An angle 68 is attached to the bottom of the tube 65 and to the flat bar 66 to form a U-shaped recess therebetween. An angle 69 also extends downwardly from the lower surface of the upper tube 65 of the frame 64 and is attached to the flat bar 67 to form a U-shaped recess. The U-shaped recesses cooperate with the front end loader 36 (see FIG. 5) in the same manner as discussed with respect to the frame 14 of FIG. 1. The frame 64 (see FIG. 6) also includes three rectangular shaped tubes 70, 71, and 72 extending between the angles 68 and 69.

The screw spears 61 (see FIG. 8), 62, and 63 are rotatably supported in housings 73, 74, and 75, respectively, which are supported by the frame 64. The housings 73, 74, and 75 rotatably support the screw spears 61, 62, and 63, respectively, in substantially the same manner as the housing 21 (see FIG. 4) rotatably supports the screw spear 11.

The housing 73 is disposed between the tubes 65 (see FIG. 6) and 70 of the frame 64 and welded to each. A pair of gusset 76 extends between the housing 73 and portions of the tubes 65 and 70 to also support the housing 73.

The housing 74 is supported between the tubes 65 and 70 and welded to each. A pair of gussets 77 extends between the housing 74 and the tubes 65 and 70 to also support the housing 74.

The housing 75 (see FIG. 7) is disposed between the tubes 71 (see FIG. 6) and 72 of the frame 64 and welded to each. A pair of gussets 78 extends between the housing 75 (see FIG. 7) and the tubes 71 (see FIG. 6) and 72 to also support the housing 75 (see FIG. 7).

Figure 9:
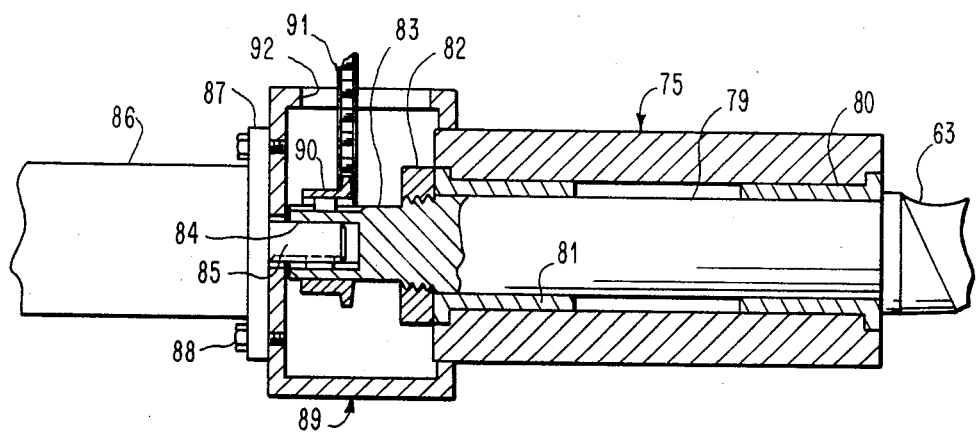
FIG. 9 is a fragmentary sectional view, partly in top plan, of the connection between a hydraulic motor and one of the screw spears of the apparatus of FIGS. 6-8 including the housing supporting the motor.
Figure 6:
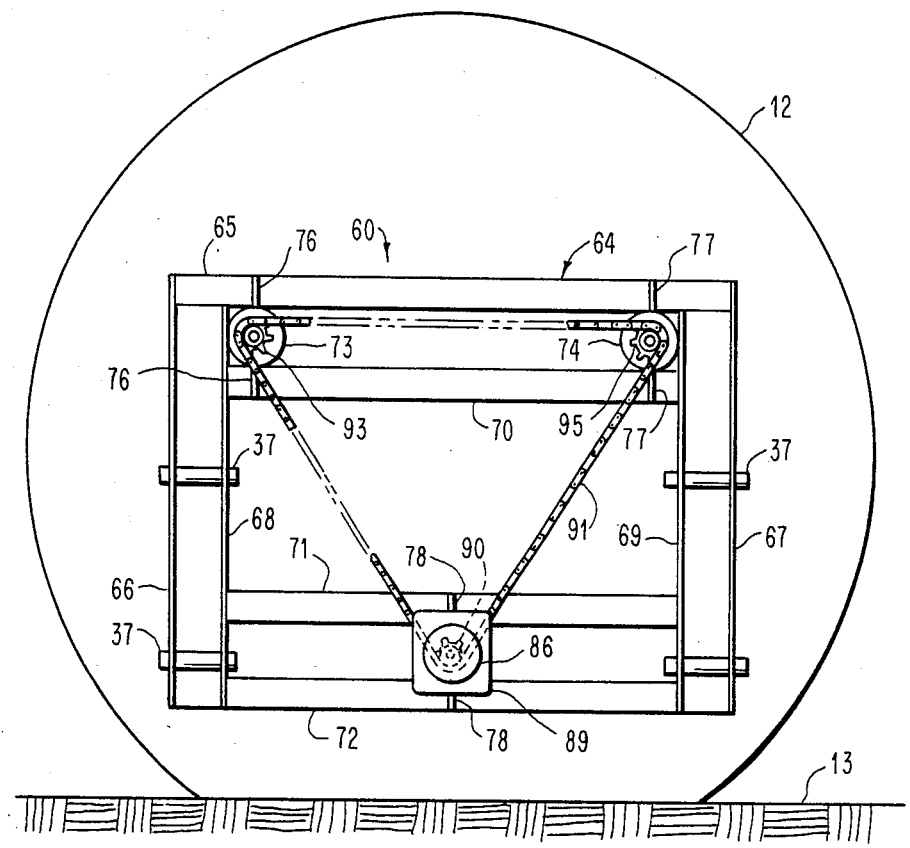
FIG. 6 is a rear elevational view of another embodiment of the hay bale handling apparatus of the present invention.

As shown in FIG. 9, the screw spear 63 has a first reduced portion 79 extending through the housing 75 and rotatably supported on a pair of L-shaped bearings 80 and 81, which are brass, in the housing 75. The screw spear 63 has a retaining nut 82 on a threaded end of the first reduced portion 79. The retaining nut 82 engages the L-shaped bearing 81 to retain the screw spear 63 within the housing 75.

The screw spear 63 terminates in a second reduced portion 83, which is of smaller diameter than the first reduced portion 79, having a passage 84 therein to receive an output shaft 85 of a hydraulic motor 86. The coupling between the output shaft 85 of the hydraulic motor 86 and the second reduced portion 83 of the screw spear 63 is by a key on the output shaft 85 being disposed in a keyway in the second reduced portion 83 of the screw spear 63 in the same manner as described for connecting the screw spear 11 (see FIG. 4) and the output shaft 30 of the hydraulic motor 23.

One suitable example of the hydraulic motor 86 (see FIG. 9) is sold by the Hydraulics Division of Eaton Corporation, Eden Prairie, Minn. as the standard motor in its 2000 series. The hydraulic motor 86 has a mounting flange 87 with two diametrically disposed holes to receive two screws 88 extending into threaded holes in a mounting support 89 to mount the hydraulic motor 86 on the mounting support 89. The mounting support 89 is fixed to the housing 75 by welding, for example.

The second reduced portion 83 of the screw spear 63 has a sprocket 90 mounted thereon with an endless chain 91 passing therearound. The mounting support 89 has an opening 92 through which the chain 91 exits.

Figure 8:
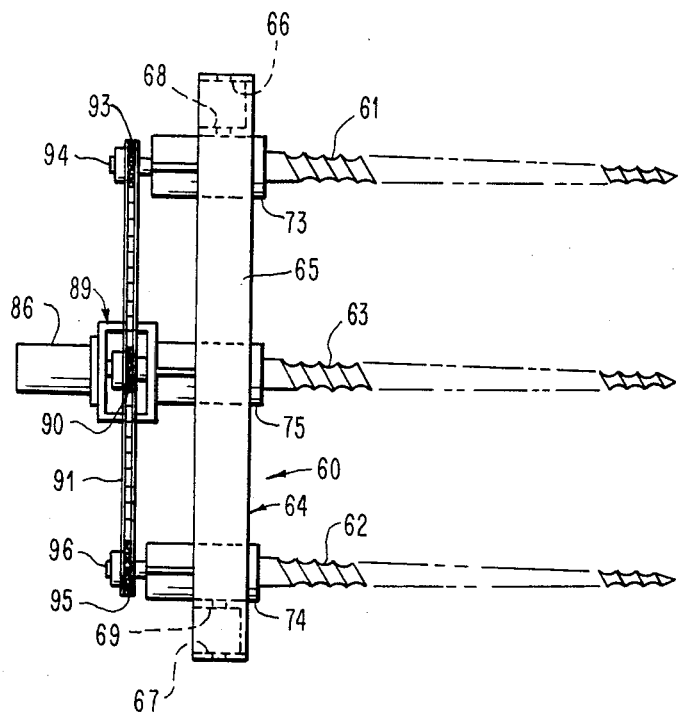
FIG. 8 is a top plan view of the apparatus of FIG. 6.
Figure 7:
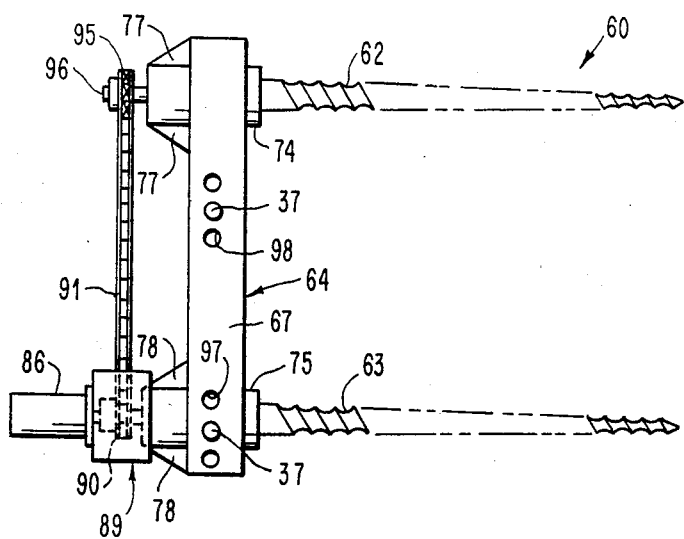
FIG. 7 is a side elevational view of the apparatus of FIG. 6.

As shown in FIG. 8, the screw spear 61 has a sprocket 93 mounted on its second reduced portion 94 and extending beyond the end of the housing 73. The screw spear 62 has a sprocket 95 mounted on its second reduced portion 96 and extending beyond the housing 74. The endless chain 91 passes around the sprockets 90, 93, and 95 to rotate all of the screw spears 61, 62, and 63 in the same direction and at the same speed when the hydraulic moto 86 is activated.

Each of the housings 73 and 74 rotatably supports the screw spears 61 and 62, respectively, in the same manner as the screw spear 63 is rotatably supported in the housing 75 as shown in FIG. 9. The only differences are that the mounting support 89 and the hydraulic motor 86 are not utilized with either the housing 73 (see FIG. 8) or the housing 74.

The frame 64 is mounted on the front end loader 36 (see FIG. 5) in the same manner as the frame 14. Thus, one of the attaching pins 37 extends through one of three holes 97 (see FIG. 7) in the flat bar 67 and one of the attaching pins 37 extends through one of three holes 98 in the flat bar 67. Similar holes are provided in the flat bar 66 (see FIG. 6) and the angles 68 and 69.

When using the three screw spears 61 (see FIG. 8), 62, and 63, it is not necessary that they have as large a diameter as the single screw spear 11 (see FIG. 2) or be as long. For example, when the round hay bale 12 (see FIG. 6) has a five foot diameter and a five foot length and is to be penetrated by the screw spears 61 (see FIG. 8), 62, and 63, each of the screw spears 61-63 preferably has a length of thirty inches and a maximum diameter of two inches tapering to one inch at its free end. This provides sufficient bearing surface for the round hay bale 12 (see FIG. 6) because of the use of the three screw spears 61 (see FIG. 8), 62, and 63.

Because of the three screw spears 61-63 being employed, it is not necessary for the bearing rack 45 (see FIG. 1) to be used for stability although it could be employed if desired. This is because the three screw spears 61 (see FIG. 8), 62, and 63 provide stability to the bale 12 (see FIG. 6). At the same time, the three screw spears 61 (see FIG. 8), 62, and 63 penetrate the more densely packed portions of the bale 12 (see FIG. 6) than does the screw spear 11 (see FIG. 2) which penetrates into the center of the bale 12 (see FIG. 1).

The operation of advancing the screw spears 61 (see FIG. 8), 62, and 63 into the bale 12 (see FIG. 6) or withdrawing them is the same as that described for the single screw spear 11 of FIG. 2.

While the present invention has been shown and described as having the frame 14 (see FIG. 1) or the frame 64 (see FIG. 6) mounted on the front end loader 36 (see FIG. 5), it should be understood that the frame 14 (see FIG. 1) or the frame 64 (see FIG. 6) could be mounted on any other suitable structure that may be carried by the transport means 35 or any other suitable transport means. It is only necessary that the frame 14 (see FIG. 1) or the frame 64 (see FIG. 6) be mounted on a structure for transportation that includes means for raising and lowering the frame 14 (see FIG. 1) or the frame 64 (see FIG. 6).

While there have been shown the single screw spear 11 (see FIG. 1) and the three screw spears 61 (see FIG. 8), 62, and 63 in the two embodiments, it should be understood that the number of screw spears may be varied as desired. Thus, two screw spears could be used, for example.

An advantage of this invention is that it insures penetration of a round hay bale. Another advantage of this invention is that it reduces the force required to penetrate the round hay bale. A further advantage of this invention is that it obtains positive retention of a round hay bale on the screw spear without requiring penetration for the entire length of the round hay bale.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A round hay bale handling apparatus including:
 a frame for attachment to transport means or the like movable along the ground in a substantially horizontal direction;
 at least one screw spear;
 said frame having means to rotatably support said screw spear so that said screw spear extends substantially perpendicular to said frame;
 said rotatably support means being fixed to said frame and extending beyond said frame on the opposite side to that from which said screw spear extends from said frame; and
 rotating means supported solely by said rotatably support means to selectively rotate said screw spear in each direction to advance said screw spear with said screw spear substantially horizontal into a round hay bale until said frame engages the round hay bale as said frame is advanced in a substantially horizontal direction towards the round hay bale and to withdraw said screw spear from a round hay bale into which said screw spear has been advanced as said frame is moved away from the round hay bale in a substantially horizontal direction.

2. The apparatus according to claim 1 including:
 a plurality of screw spears;
 said frame having a plurality of separate means to rotatably support each of said screw spears, each of said screw spears is the same length;
 each of said rotatably support means being fixed to said frame and extending beyond said frame on the opposite side to that from which said screw spears extend from said frame;
 said rotating means including:
  driving means supported solely by one of said rotatably support means; and
  means to connect said driving means to each of said screw spears; and
 said rotating means selectively rotates all of said screw spears in the same direction for advancement into a round hay bale with each of said screw spears substantially horizontal as said frame is advanced in a substantially horizontal direction towards the round hay bale or for withdrawal from a round hay bale as said frame is moved away from the round hay bale.

3. The apparatus according to claim 2 in which said driving means of said rotating means includes a hydraulic motor supported solely by one of said rotatably support means of said frame.

4. The apparatus according to claim 3 in which:
 said hydraulic motor includes an output shaft; and
 said connecting means includes:
  a sprocket connected to each of said screw spears;
  an endless chain connected to each of said sprockets; and
  one of said sprockets connected to said output shaft of said hydraulic motor.

5. The apparatus according to claim 4 including:
 said plurality of rotatably support means comprising a plurality of housings supported by said frame;
 each of said housings rotatably supporting one of said screw spears; and
 one of said housings solely supporting said hydraulic motor.

6. The apparatus according to claim 2 including bale stabilizing means supported solely by said frame for engaging the round hay bale only when said screw spears have substantially completed advancement into the round hay bale, said bale stabilizing means being fixed against rotation.

7. The apparatus according to claim 1 including:
 three screw spears;
 said frame having a plurality of separate means to rotatably support each of said screw spears;
 each of said three screw spears is the same length;
 said three screw spears being spaced from each other on said frame so as to form the corners of an equilateral triangle;
 each of said rotatably support means being fixed to said frame and extending beyond said frame on the opposite side to that from which said screw spears extend from said frame;
 said rotating means including:
  driving means supported solely by one of said rotatably support means; and
  means to connect said driving means to each of said screw spears; and
 said rotating means selectively rotates all of said screw spears in the same direction for advancement into a round hay bale with each of said screw spears substantially horizontal as said frame is advanced in a substantially horizontal direction towards the round hay bale or for withdrawal from a round hay bale as said frame is moved away from the round hay bale.

8. The apparatus according to claim 7 in which said driving means of said rotating means includes a hydraulic motor supported solely by one of said rotatably support means of said frame.

9. The apparatus according to claim 8 in which:
 said hydraulic motor includes an output shaft; and
 said connecting means includes:
  a sprocket connected to each of said screw spears;
  an endless chain connected to each of said sprockets; and
  one of said sprockets connected to said output shaft of said hydraulic motor.

10. The apparatus according to claim 7 including bale stabilizing means supported solely by said frame for engaging the round hay bale only when said screw spears have substantially completed advancement into the round hay bale, said bale stabilizing means being fixed against rotation.

11. The apparatus according to claim 1 in which said frame has only one of said screw spears rotatably supported thereby.

12. The apparatus according to claim 11 including bale stabilizing means supported solely by said frame for engaging the round hay bale only when said screw spears have substantially completed advancement into the round hay bale, said bale stabilizing means being fixed against rotation.

13. The apparatus according to claim 11 in which said rotating means includes a hydraulic motor supported by said frame.

14. The apparatus according to claim 1 including bale stabilizing means supported solely by said frame for engaging the round hay bale only when said rotating means has substantially completed advancement of said screw spear into the round hay bale, said bale stabilizing means being fixed against rotation.

15. A round hay bale handling apparatus including:
a frame for attachment to transport means or the like movable along the ground in a substantially horizontal direction;
said frame having at least one housing supported thereby;
a screw spear rotatably supported by said housing, said screw spear having a length slightly less than the length of a round hay bale into which said screw spear is to be advanced;
driving means supported by said housing;
means to connect said driving means to said screw spear to cause advancement of said screw into a round hay bale with said screw spear substantially horizontal as said frame is advanced in a substantially horizontal direction towards the round hay bale and withdrawal of said screw spear from a round hay bale into which said screw spear has been advanced as said frame is moved away from the round hay bale in a substantially horizontal direction;
a bearing rack supported solely by said frame and fixed against rotation; and
said bearing rack having a plurality of picks of relatively short length for slight penetration into the round hay bale that begins only when said screw spear has substantially completed advancement into the round hay bale to provide stability to the round hay bale, said picks surrounding said screw spear.

16. The apparatus according to claim 15 in which:
said frame has a plurality of housings supported thereby;
a screw spear is rotatably supported by each of said housings;
said connecting means connects said driving means to all of said screw spears to cause rotation of each of said screw spears in the same direction; and
said picks surround said screw spears.

* * * * *

UNITED STATES PATENT AND TRADEMARK OFFICE
CERTIFICATE OF CORRECTION

PATENT NO. : 4,583,900

DATED : April 22, 1986

INVENTOR(S) : Nickolas A. Cooley

It is certified that error appears in the above-identified patent and that said Letters Patent is hereby corrected as shown below:

Column 7, line 17, "gusset" should read --- gussets ---.

Column 8, line 2, "moto" should read --- motor ---.

Column 9, line 20, cancel "and".

line 21, before "rotating" insert --- and ---.

line 43, cancel "and".

line 44, before "means" (first occurrence) insert --- and ---.

line 45, cancel "and".

line 46, before "said" (first occurrence) insert --- and ---.

line 59, cancel "and".

line 60, before "said" insert --- and ---.

line 63, cancel "and"

line 64, before "one" insert --- and ---.

Column 10, line 2, cancel "and".

line 3, before "one" insert --- and ---.

line 25, cancel "and".

UNITED STATES PATENT AND TRADEMARK OFFICE
CERTIFICATE OF CORRECTION

PATENT NO. : 4,583,900                      Page 2 of 3

DATED : April 22, 1986

INVENTOR(S) : Nickolas A. Cooley

It is certified that error appears in the above-identified patent and that said Letters Patent is hereby corrected as shown below:

line 26, before "means" (first occurrence) insert --- and ---.

line 27, cancel "and".

lnne 28, before "said" (first occurrence) insert --- and ---.

line 41, cancel "and".

line 42, before "said" insert --- and ---.

line 45, cancel "and".

line 46, before "one" insert --- and ---.

Column 11, line 16, after "screw" insert --- spear ---.

Column 12, line 4, cancel "and".

line 5, before "said" insert --- and ---.

UNITED STATES PATENT AND TRADEMARK OFFICE
CERTIFICATE OF CORRECTION

PATENT NO. : 4,583,900
DATED : April 22, 1986
INVENTOR(S) : Nickolas A. Cooley

It is certified that error appears in the above—identified patent and that said Letters Patent is hereby corrected as shown below:

line 20, cancel "and".

line 21, before "said (first occurrence) insert --- and ---.

Signed and Sealed this

Fifth Day of August 1986

[SEAL]

Attest:

DONALD J. QUIGG

Attesting Officer

Commissioner of Patents and Trademarks